(12) United States Patent
Sato et al.

(10) Patent No.: US 9,789,733 B2
(45) Date of Patent: Oct. 17, 2017

(54) PNEUMATIC TIRE

(71) Applicant: Sumitomo Rubber Industries, Ltd., Kobe-shi, Hyogo (JP)

(72) Inventors: Takuya Sato, Kobe (JP); Hiroyuki Nakayama, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 311 days.

(21) Appl. No.: 14/606,152

(22) Filed: Jan. 27, 2015

(65) Prior Publication Data

US 2015/0231928 A1 Aug. 20, 2015

(30) Foreign Application Priority Data

Feb. 14, 2014 (JP) .................................. 2014-026860
May 27, 2014 (JP) .................................. 2014-109375

(51) Int. Cl.
*B60C 11/03* (2006.01)
*B60C 11/12* (2006.01)

(52) U.S. Cl.
CPC .......... *B60C 11/03* (2013.01); *B60C 11/0306* (2013.01); *B60C 11/1259* (2013.01);
(Continued)

(58) Field of Classification Search
CPC ......... B60C 11/03; B60C 11/04; B60C 11/12; B60C 11/042; B60C 11/0304;
(Continued)

(56) References Cited

U.S. PATENT DOCUMENTS 4,289,182 A * 9/1981 Sato .................... B60C 11/0302
152/209.11
2005/0183807 A1* 8/2005 Hildebrand ......... B60C 11/0306
152/209.2
(Continued)

FOREIGN PATENT DOCUMENTS

EP 2 570 270 A1 3/2013
JP 2010-132181 A 6/2010
(Continued)

OTHER PUBLICATIONS

Extended European Search Report, dated Nov. 25, 2015, for European Application No. 15153986.3.

*Primary Examiner* — Eric Hug
(74) *Attorney, Agent, or Firm* — Birch, Stewart, Kolasch & Birch, LLP (57) ABSTRACT

A pneumatic tire comprises a tread portion provided on each side of the tire equator with a middle land portion defined between a shoulder main groove and a crown main groove each extending continuously in the tire circumferential direction. The middle land portion is provided with axially inside middle lug grooves and axially outside middle lug grooves arranged alternately in the tire circumferential direction. The axially inside middle lug groove is connected to the crown main groove at an angle θ1 of from 20 to 45 degrees with respect to the tire circumferential direction and has an axially inner opened end and an axially outer closed end. The outside middle lug grooves is connected to the shoulder main groove at an angle θ2 of from 60 to 80 degrees with respect to the tire circumferential direction and has an axially outer open end and an axially inner closed end. The tread portion may be provided with a shoulder land (Continued)

portion comprising circumferential sipes, axial grooves terminating at the circumferential sipes, and a circumferentially continuous rib.

20 Claims, 8 Drawing Sheets (52) U.S. Cl.
CPC ... *B60C 11/1272* (2013.01); *B60C 2011/0372* (2013.01); *B60C 2011/0374* (2013.01); *B60C 2011/0381* (2013.01); *B60C 2011/0395* (2013.01)

(58) Field of Classification Search
CPC ............. B60C 11/0306; B60C 11/0309; B60C 11/1272; B60C 2011/039; B60C 2011/0393; B60C 2011/0395; B60C 2011/0353; B60C 2011/0358; B60C 2011/0369; B60C 2011/0386; B60C 2011/0372; B60C 2011/0383; B60C 2011/0374; B60C 2011/0381

USPC ...... 152/209.3, 209.8, 209.9, 209.16, 209.27
See application file for complete search history.

(56) References Cited

U.S. PATENT DOCUMENTS

| | | | |
|---|---|---|---|
| 2013/0167996 A1* | 7/2013 | Oda | B60C 11/04 152/209.18 |
| 2014/0150941 A1* | 6/2014 | Takei | B60C 11/04 152/209.8 |
| 2014/0238563 A1* | 8/2014 | Tanaka | B60C 11/0306 152/209.2 |
| 2014/0290815 A1* | 10/2014 | Tomida | B60C 11/1236 152/209.18 |
| 2016/0144665 A1* | 5/2016 | Koishikawa | B60C 11/0306 152/209.1 |

FOREIGN PATENT DOCUMENTS

| | | | |
|---|---|---|---|
| JP | 2012-188080 A | 10/2012 | |
| WO | WO 2013/015346 | * 1/2013 | ......... B60C 11/0304 |

* cited by examiner

PNEUMATIC TIRE

BACKGROUND OF THE INVENTION

The present invention relates to a pneumatic tire, more particularly to a tread pattern capable of satisfying both of wet performance and steering stability.

Japanese Patent Application Publication Nos. 2012-188080 and 2010-132181 each disclose a pneumatic tire provided in the tread portion with lug grooves, wherein the lug groove is defined as having an end opened to a main groove or wide circumferential groove and another end terminating within a land portion in which the concerned lug groove is disposed.

Such lug groove can maintain the rigidity of the land portion to improve the steering stability of the tire when compared with an axial groove whose both ends are opened to main grooves on both sides thereof. In the case of the lug groove, however, there is a possibility that the wet performance of the tire is deteriorated.

Thus, the pneumatic tires disclosed in the above-mentioned patent documents have room for improvement to satisfy both of the wet performance and the steering stability.

SUMMARY OF THE INVENTION

It is therefore, an object of the present invention to provide a pneumatic tire in which, by specifically configuring middle land portions provided with lug grooves, both of wet performance and steering stability can be improved.

According to the present invention, a pneumatic tire comprises:

a tread portion provided on each side of the tire equator with a middle land portion defined between an axially outer shoulder main groove and an axially inner crown main groove each extending continuously in the tire circumferential direction, wherein the middle land portion is provided with axially inside middle lug grooves and axially outside middle lug grooves arranged alternately in the circumferential direction, the axially inside middle lug grooves and the axially outside middle lug grooves are inclined to the same direction, each of the axially inside middle lug grooves is connected to the crown main groove at an angle $\theta 1$ of from 20 to 45 degrees with respect to the tire circumferential direction so as to have an axially inner end opened to the crown main groove and an axially outer end terminating within the middle land portion, and each of the outside middle lug grooves is connected to the shoulder main groove at an angle $\theta 2$ of from 60 to 80 degrees with respect to the tire circumferential direction so as to have an axially outer end opened to the shoulder main groove and an axially inner end terminating within the middle land portion.

Therefore, during running in wet conditions, the inside middle lug grooves can lead the water existing in the crown main grooves toward the axially outside and improve the wet performance. The outside middle lug grooves can maintain the rigidity of the middle land portion to improve the steering stability. Thus, the pneumatic tire can satisfy both of the wet performance and the steering stability.

The pneumatic tire according to the present invention may have the following features:

(1) each of the inside middle lug grooves is a bent groove comprising an axially inner first part connected to the crown main groove and extending at the angle $\theta 1$, and an axially outer second part extending at an angle $\theta 3$ with respect to the tire circumferential direction which is more than the angle $\theta 1$;

(2) the second parts extend substantially parallel with the outside middle lug grooves;

(3) the axial length of the first part is 0.25 to 0.50 times the axial width of the middle land portion;

(4) the axially inner end of the outside middle lug groove is positioned axially inside the axially outer end of the inside middle lug groove;

(5) the middle land portion is provided on its axially inner edge with middle reentrant parts so as to position between the inside middle lug grooves, and the middle land portion is provided with sipes extending between the middle reentrant parts and the inner ends of the outside middle lug grooves.

Further, the pneumatic tire according to the present invention may have the following features:

(6) the tread portion is provided with a shoulder land portion defined between each shoulder main groove and the adjacent tread edge, the shoulder land portion is provided with a plurality of shoulder axial grooves extending axially inwardly from the tread edge and terminating within the shoulder land portion, a plurality of shoulder circumferential sipes connecting between the axially inner ends of the shoulder axial grooves, and a circumferentially continuously extending rib defined between the shoulder main groove and the shoulder circumferential sipes;

(7) the shoulder land portion is provided between every two of the circumferentially adjacent shoulder axial grooves with a shoulder axial sipe extending axially inwardly from the tread edge and terminating without being connected to the shoulder circumferential sipes;

(8) the shoulder axial grooves have a groove width of from 3.5 to 5.5 mm;

(9) the outside middle lug grooves disposed in the middle land portion and the shoulder axial grooves disposed in the adjacent shoulder land portion are arranged circumferentially of the tire such that, in the tire circumferential direction, circumferential extents of the outside middle lug grooves do not overlap with circumferential extents of the shoulder axial grooves.

During running in wet conditions, the shoulder axial grooves effectively discharge the water existing between the tire and the road toward the axially outside. The shoulder circumferential sipes can decrease the increased pressure of the air in the shoulder axial grooves when entered in the ground contacting patch of the tire, therefore so called pumping noise sound from the shoulder axial groove can be reduced. The circumferentially continuously extending rib can reduce the transmittal toward the tread edge, of pumping noise sound generated from the grooves on the axially inside thereof and impact sound of the land portion, therefore, the noise performance can be improved. Thus, it is possible to satisfy both of the wet performance and the noise performance.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like.

The standard load is the "maximum load capacity" in JATMA, the "Load Capacity" in ETRTO, the maximum value given in the above-mentioned table in TRA or the like.

The tread edges Te are the axially outermost edges of the ground contacting patch which occurs under the normally inflated loaded condition when the camber angle of the tire is zero.

The tread width TW is the width measured under the normally inflated unloaded condition, as the axial distance between the tread edges Te determined as above.

The term "sipe" means a narrow groove having a groove width of not more than 1 mm or a cut having substantially no groove width.

DESCRIPTION OF THE PREFERRED EMBODIMENTS

Embodiments of the present invention will now be described in detail in conjunction with the accompanying drawings.

According to the present invention, pneumatic tire 1 comprises a tread portion 2, a pair of axially spaced bead portions each with a bead core therein, a pair of sidewall portions extending between the tread edges and the bead portions, a carcass extending between the bead portions through the tread portion 2 and sidewall portions, a tread reinforcing belt disposed radially outside the carcass in the tread portion 2 as well known in the tire art.

In the following embodiment of the present invention, the pneumatic tire 1 is designed for passenger cars. The present invention is suitably applied to passenger car tires.

Figure 1:
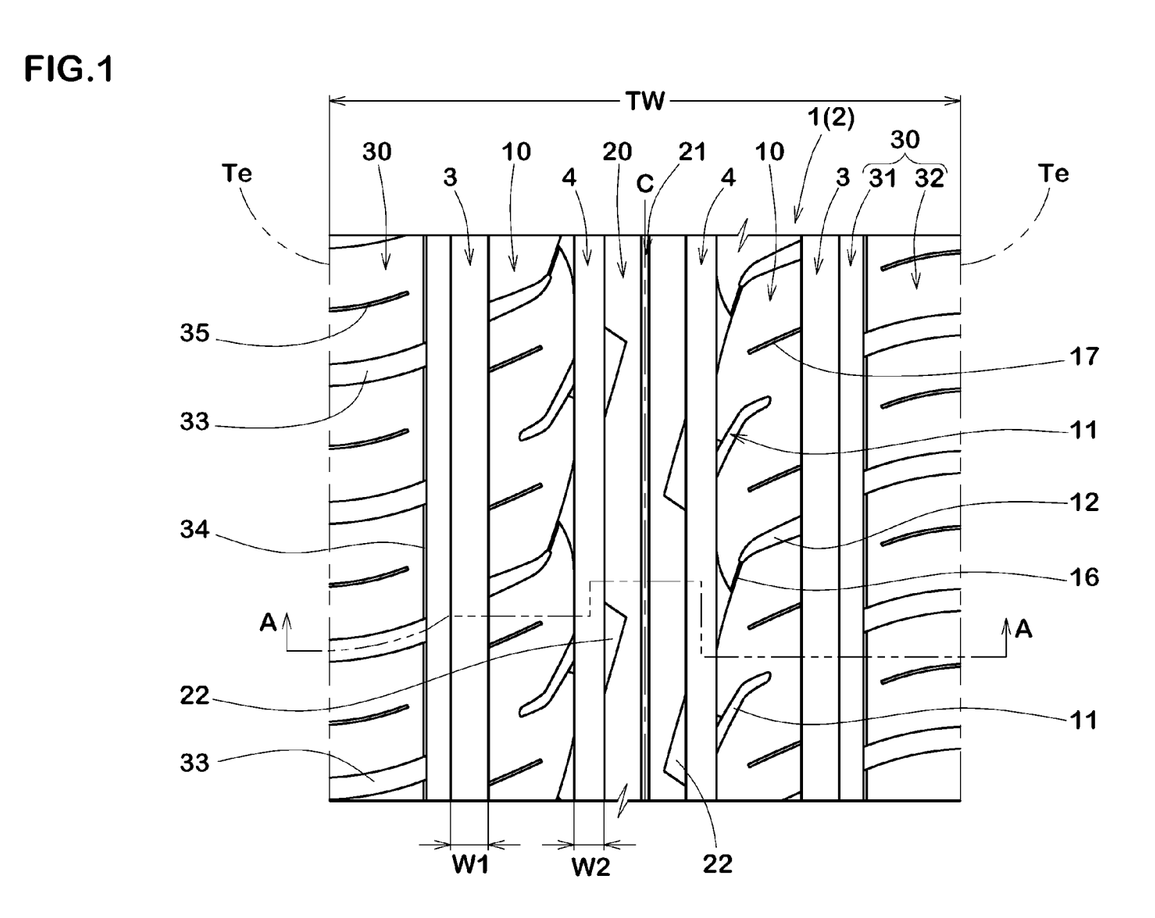
FIG. 1 is a developed partial plan view of a pneumatic tire as an embodiment of the present invention showing the tread portion thereof.

The tread portion 2 is, as shown in FIG. 1, provided on each side of the tire equator C with an axially outer shoulder main groove 3 and an axially inner crown main groove 4.

The shoulder main groove 3 extends continuously in the tire circumferential direction.

In this embodiment, the shoulder main groove 3 has a substantially constant groove width W1.

In this embodiment, the shoulder main groove 3 is a straight groove.

The crown main groove 4 extends continuously in the tire circumferential direction.

In this embodiment, the crown main groove 4 has a substantially constant groove width W2.

In this embodiment, the crown main groove 4 is a straight groove. In this embodiment, the crown main groove 4 is disposed on each side of the tire equator C. But, in another embodiment, it may be possible to provide a single crown main groove 4 which, for example. extends along the tire equator C, The groove width W1 of the shoulder main groove 3 and the groove width W2 of the crown main groove 4 are each set in a range of not less than 2.5%, preferably not less than 4.5, but not more than 7.5%, preferably not more than 6.5% of the tread width TW in order to enhance the drainage of water existing between the road surface and the tread portion 2 and thereby to improve wet performance of the tire during running in wet conditions.

In this embodiment, each of the widths W1 and W2 is constant along the length of the groove. But, it may be changed within the above-mentioned range.

Figure 2:
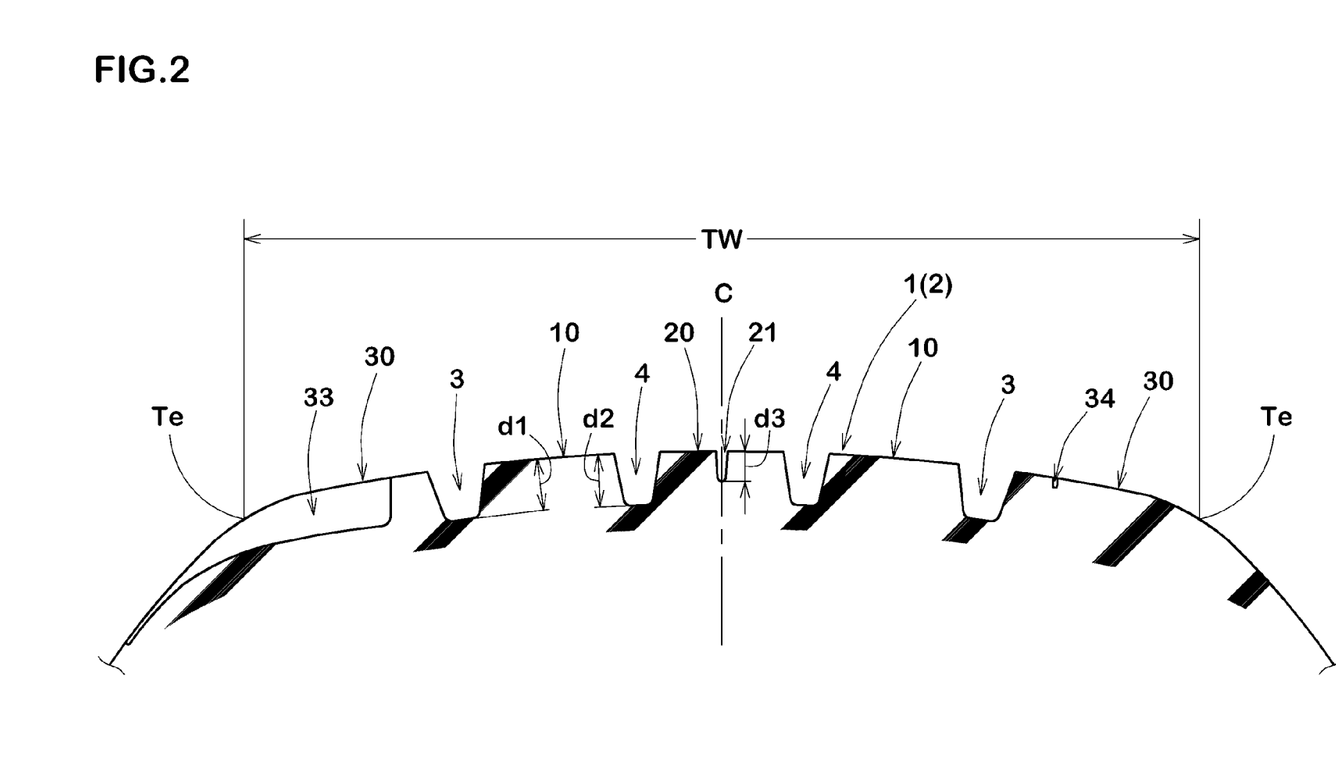
FIG. 2 is a cross sectional view of the tread portion taken along line A-A of FIG. 1.

In the case that the pneumatic tire 1 is for the passenger cars, it is preferable that, as shown in FIG. 2, the groove depths d1 and d2 of the shoulder main groove 3 and the crown main groove 4, respectively, are set in a range of from about 5 mm to about 10 mm.

By the shoulder main grooves 3 and the crown main grooves 4, the tread portion 2 is divided into five land portions which are a center land portion 20 between the crown main grooves 4, a pair of middle land portions 10 between the crown main grooves 4 and the shoulder main grooves 3, and a pair of shoulder land portions 30 axially outside the respective shoulder main grooves 3.

Figure 3:
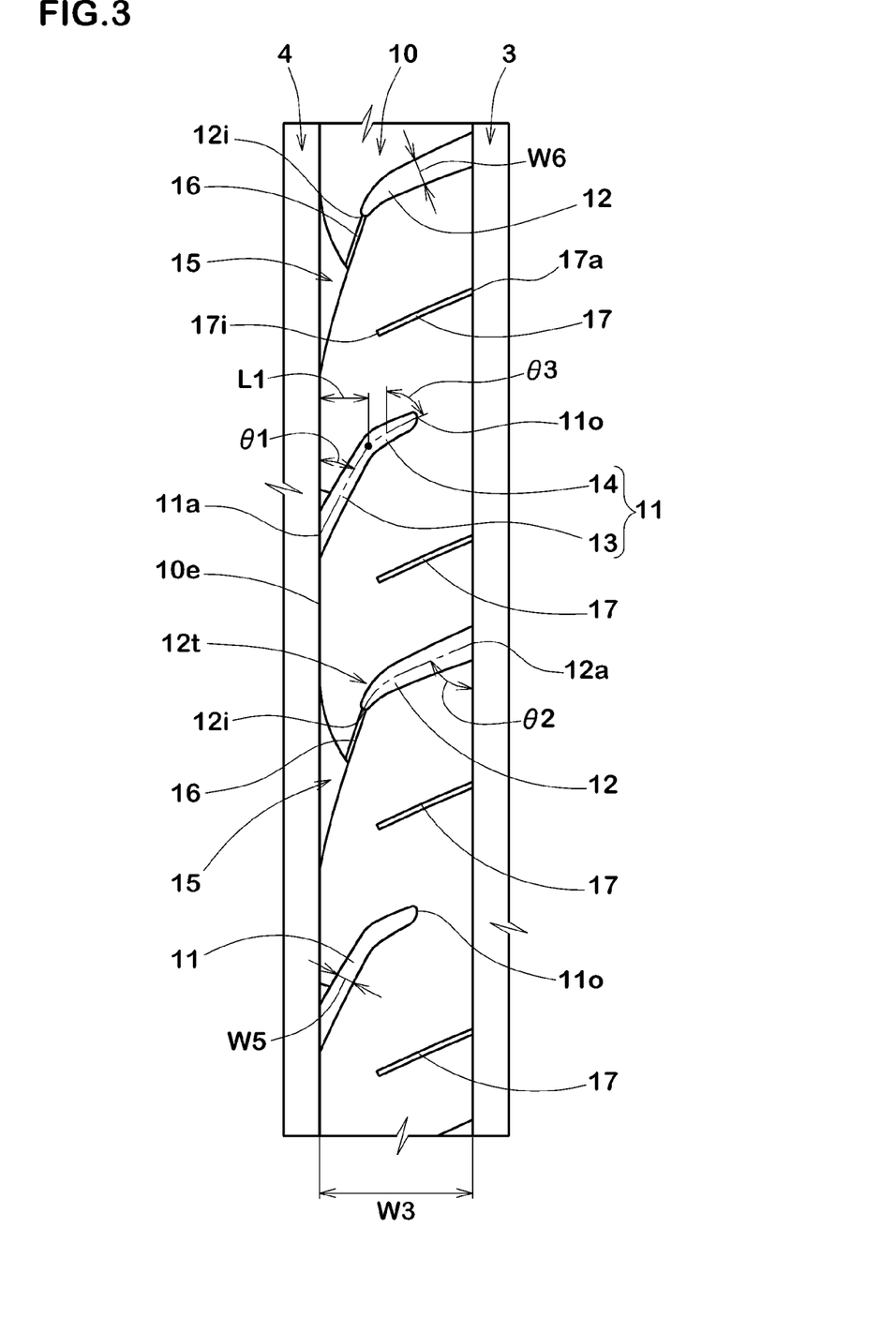
FIG. 3 is a partial top view of a middle land portion of the tire shown in FIG. 1.

Each of the middle land portions 10 is, as shown in FIG. 3, provided with inside middle lug grooves 11 and outside middle lug grooves 12 which are arranged alternately in the circumferential direction.

The inside middle lug grooves 11 are inclined with respect to the tire circumferential direction.

Each of the inside middle lug grooves 11 has an axially inner end 11a connected to the crown main groove 4 and an axially outer end 11o terminating within the middle land portion 10.

The outside middle lug grooves 12 are inclined to the same direction as that of the inside middle lug grooves 11. Each of the outside middle lug grooves 12 has an axially outer end 12a connected to the shoulder main groove 3 and an axially inner end 12i terminating within the middle land portion 10.

Such inside middle lug grooves 11 and outside middle lug grooves 12 avoid the rigidity of the middle land portions 10 from decreasing to improve the steering stability, while improving the wet performance.

Each of the inside middle lug grooves 11 is connected to the crown main groove 4 at an angle θ1 of 20 to 45 degrees with respect to the tire circumferential direction.

During running in wet conditions, such inside middle lug grooves 11 lead water existing in the crown main groove 4 toward the axially outside to improve the wet performance.

In order to improve the wet performance while maintaining the rigidity of the middle land portion 10, the angle θ1 is preferably set in a range of not less than 25 degrees, more preferably not less than 30 degrees, but not more than 40 degrees, more preferably not more than 35 degrees.

Each of the outside middle lug grooves 12 is connected to the shoulder main groove 3 at an angle θ2 of from 60 to 80 degrees with respect to the tire circumferential direction.

Such outside middle lug grooves 12 avoid the rigidity of the middle land portion 10 in its axially outer part from decreasing to improve the steering stability.

In order to achieve the wet performance and the steering stability in a well balanced manner, the angle θ2 is preferably set in a range of not less than 65 degrees, more preferably not less than 68 degrees, but not more than 75 degrees, more preferably not more than 72 degrees.

In this embodiment, the inside middle lug groove 11 is a bent groove comprising a first part 13 and a second part 14.

The first part 13 is connected to the crown main groove 4 and extends straight at the above-mentioned angle θ1.

The axial length L1 of the first part 13 is preferably set in a range of not less than 0.25 times, more preferably not less than 0.35 times, but not more than 0.50 times, more preferably not more than 0.45 times the axial width W3 of the middle land portion 10 in order to improve the wet performance and the steering stability in a well balanced manner.

The inclination angle of the first part 13 with respect to the tire circumferential direction is θ1 and preferably not less than 20 degrees, more preferably not less than 25 degrees, but preferably not more than 45 degrees, more preferably not more than 40 degrees so that the first part leads the water existing in the crown main groove 4 toward the axially outside during running in wet conditions to improve the wet performance.

The second part 14 is inclined with respect to the tire circumferential direction at an angle θ3 more than the above-mentioned angle θ1 so that the water existing in the crown main groove 4 is lead toward the axially outside during running in wet conditions and the wet performance is improved.

The angle θ3 of the second part 14 is preferably set in a range of not less than 60 degrees, more preferably not less than 65 degrees, but not more than 80 degrees, more preferably not more than 75 degrees in order to avoid the axial rigidity of the middle land portion 10 from decreasing to improve the steering stability and as well as the wet performance.

It is preferable that the second parts 14 extend substantially parallel with the outside middle lug grooves 12 in order to even the distribution of the rigidity of the middle land portion 10 and prevent uneven wear of the middle land portion 10.

It is preferable that the groove width W5 of the inside middle lug groove 11 is gradually decreased toward the axially outside of the tire.

In this embodiment, at the tread surface, the axially outer end 11o of the inside middle lug groove 11 is curved like a circular arc. such inside middle lug grooves 11 maintain the rigidity of the middle land portion 10 and improve the steering stability. In this embodiment, the groove width W5 of the inside middle lug groove 11 is set in a range of from 3.0 to 6.0 mm for example.

It is preferable that each of the outside middle lug grooves 12 extends substantially straight at the above-mentioned angle θ2 in order to improve the wet performance.

It is preferable that the axially inner end part 12t of the outside middle lug groove 12 is curved and terminates in order to prevent cracking of the middle land portion 10 which starts from the inner end 12i.

It is preferable that the axially inner end 12i of the outside middle lug groove 12 is positioned axially inside the axially outer end 11o of the inside middle lug groove 11 to further improve the wet performance.

It is preferable that the groove width W6 of the outside middle lug groove 12 is gradually decreased toward the axially inside of the tire in order to maintain the rigidity of the middle land portion 10 to improve the steering stability. In this embodiment, the groove width W6 is set in a range of from 3.0 to 6.0 mm.

The angle θ3 of the outside middle lug groove 12 with respect to the tire circumferential direction is preferably set in a range of not less than 60 degrees, more preferably not less than 65 degrees, but not more than 80 degrees, more preferably not more than 75 degrees in order to improve the wet performance while maintaining the axial rigidity of the middle land portion 10.

Each of the outside middle lug grooves 12 comprises an axially inner end part 28 whose angle with respect to the tire circumferential direction is gradually decreased toward the axially inside to thereby uneven wear in the vicinity of the axially inner end part 28 is prevented.

The middle land portion 10 in this embodiment is further provided with middle reentrant parts 15.

The middle reentrant parts 15 are formed on the axially inner edge 10e of the middle land portion 10.

In the tire circumferential direction, the middle reentrant parts 15 alternate with the inside middle lug grooves 11.

Figure 4:
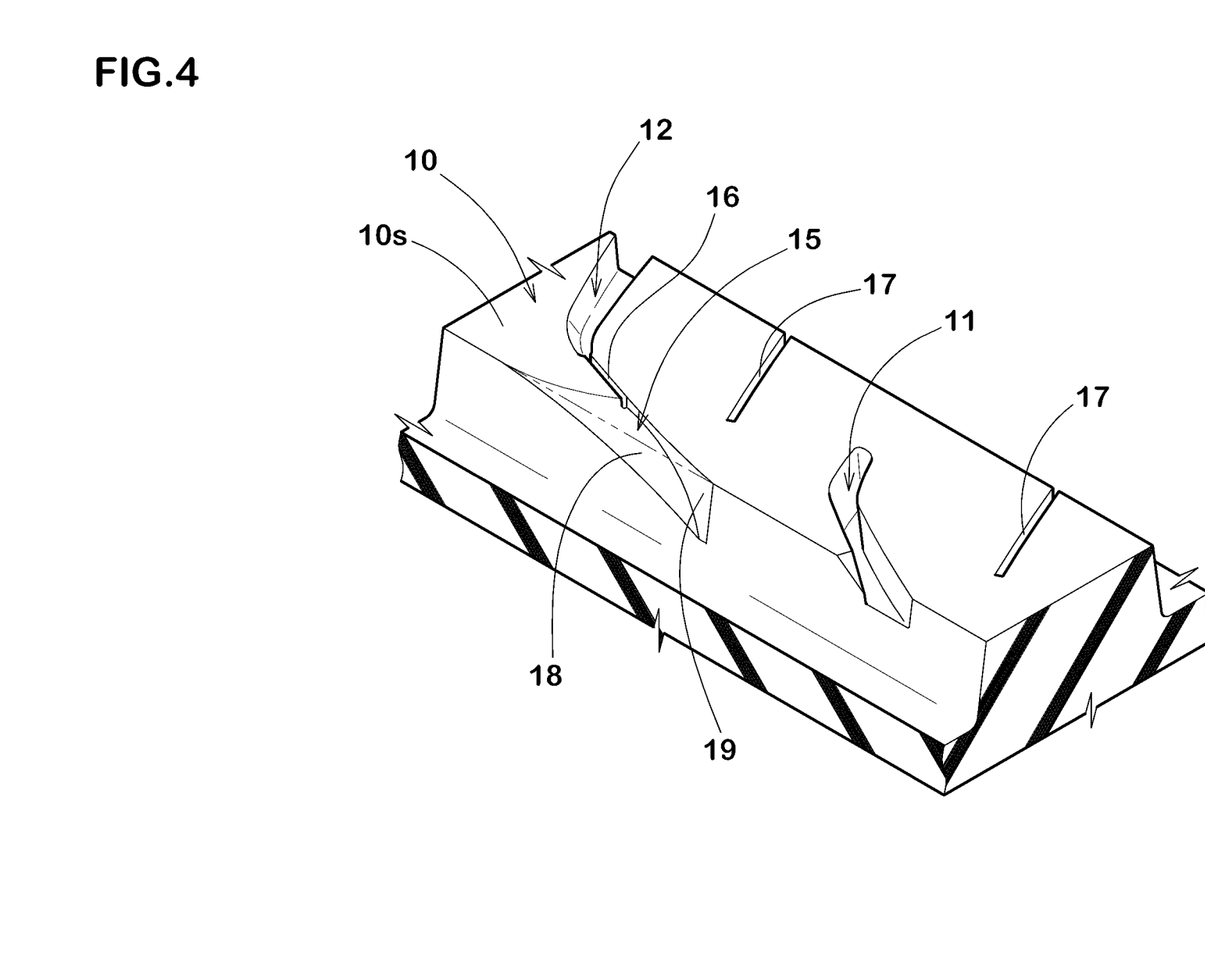
FIG. 4 is a partial perspective view of the middle land portion showing a middle reentrant part.

As shown in FIG. 4, the middle reentrant part 15 has a substantially tetrahedral shape made up of four substantially triangular faces two of which (a bottom face 18 and a side face 19) are formed on the middle land portion 10, and others are virtual faces.

It is preferable that the bottom face 18 is merged into the ground-contacting top face 10s of the middle land portion 10. In this embodiment, the bottom face 18 is inclined with respect to the ground-contacting top face 10s so that the depth of the middle reentrant part 15 gradually increases toward one circumferential direction.

The side face 19 intersects the bottom face 18 and is substantially vertical or extends parallel with the tire radial direction. The side face 19 may be a flat surface or slightly curved surface.

The middle reentrant parts 15 having such bottom face 18 and side face 19 aid the drainage of the adjacent main groove and further improve the wet performance.

Further, it can control the resonance of air column in the wide straight crown main groove 4 and can reduce the resonance noise.

In this embodiment, as shown in FIG. 3, the middle land portion is further provided with bridge sipes 16 in order to improve the wet performance.

Each of the bridge sipes 16 extends straight between the inner end 12i of one of the outside middle lug grooves 12 and one of the middle reentrant parts 15.

In this embodiment, the middle land portion 10 is further provided with middle lug sipes 17.

Each of the middle lug sipes 17 has an axially outer end 17a connected to the shoulder main groove 3, and an axially inner end 17i terminating within the middle land portion 10.

It is preferable that the middle lug sipes 17 are inclined to the same direction as that of the outside middle lug grooves 12. In this embodiment, the middle lug sipes 17 extend substantially parallel with the major parts of the respective outside middle lug grooves 12.

Such middle lug sipes 17 maintain the rigidity of the middle land portion 10 to improve the steering stability, while improving the wet performance.

It is preferable that the middle lug sipes 17 are each disposed between every two of the circumferentially adjacent outside middle lug grooves 12 and inside middle lug grooves 11.

Such middle lug sipes 17 even the distribution of the rigidity of the middle land portion 10 and control uneven wear of the middle land portion 10.

Figure 5:
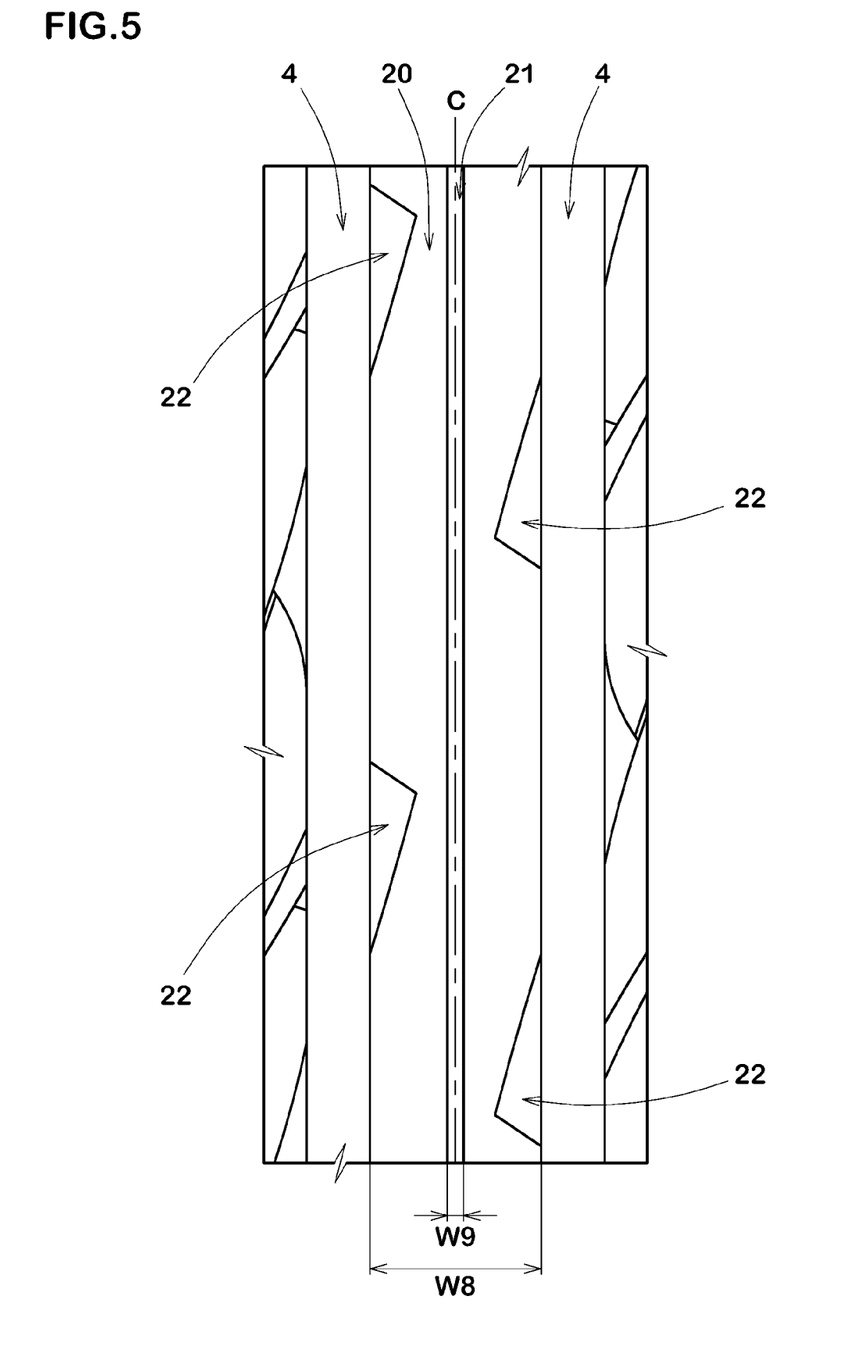
FIG. 5 is a partial top view of a center land portion of the tire shown in FIG. 1.

As shown in FIG. 5, the center land portion 20 is formed as a circumferentially continuous rib to improve the steering stability.

In this embodiment, the center land portion 20 is provided with an auxiliary center groove 21 which is narrower in width and shallower in depth that the main grooves 3 and 4.

The auxiliary center groove 21 extends straight and continuously in the tire circumferential direction. Preferably, the auxiliary center groove 21 is disposed on the tire equator C. The groove width W9 of the auxiliary center groove 21 is set in a range of from 6% to 12% of the width W8 of the center land portion 20.

The groove depth d3 of the auxiliary center groove 21 is set in a range of from 4 to 6 mm.

Such auxiliary center groove 21 improves the wet performance, while maintaining the rigidity of the center land portion 20.

In this embodiment, the center land portion 20 is provided with center reentrant parts 22 arranged circumferentially of the tire at intervals.

Figure 6:
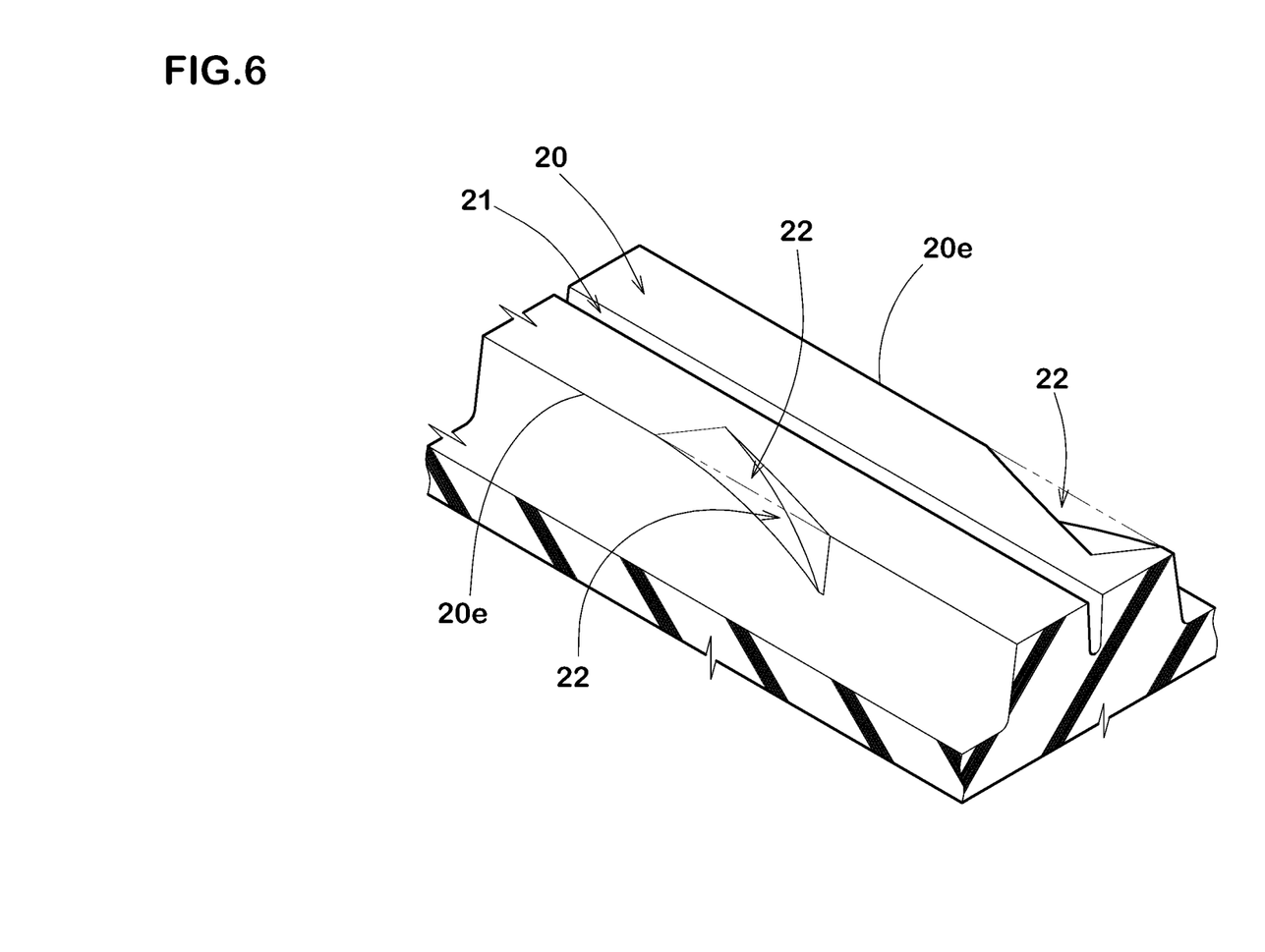
FIG. 6 is a partial perspective view of the center land portion showing a center reentrant part.

As shown in FIG. 6, the center reentrant parts 22 are formed on both edges 20e of the center land portion 20.

The center reentrant part 22 has a substantially tetrahedral shape made up of four substantially triangular faces two of which (a bottom face and a side face) are formed on the center land portion 20.

Thus, the center reentrant part 22 has the substantially same configuration as the middle reentrant part 15.

Such center reentrant parts aid the drainage of the adjacent crown main grooves 4 to improve the wet performance.

Further, it can control the resonance of air column in the wide straight crown main groove 4 and can reduce the resonance noise.

Figure 7:
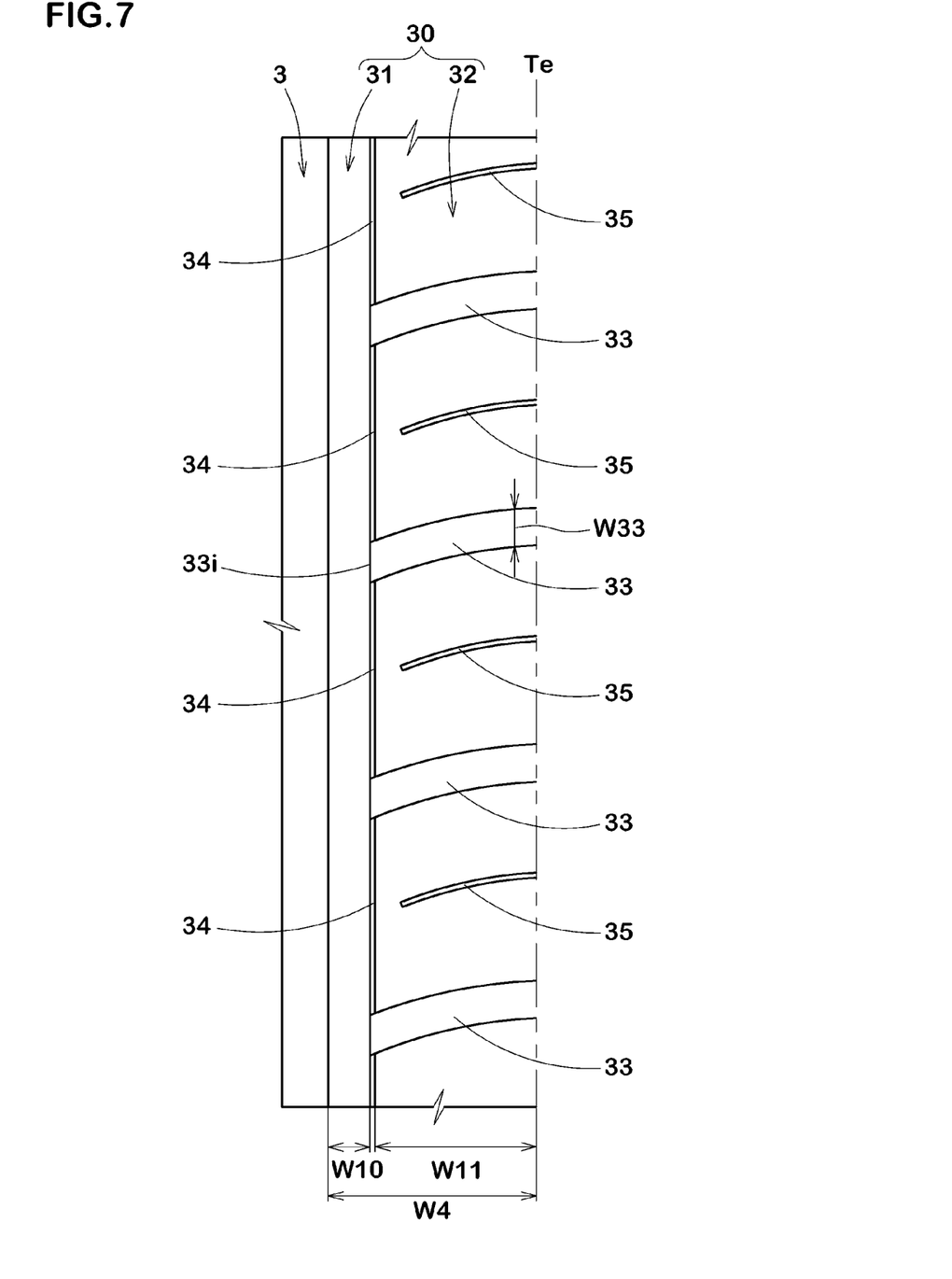
FIG. 7 is a partial top view of a shoulder land portion of the tire shown in FIG. 1.

The shoulder land portion 30 comprises, as shown in FIG. 7, an axially inner rib region (31) and an axially outer block region 32.

The rib region (31) is formed as a rib 31 extending continuously in the tire circumferential direction.

The block region 32 is formed as a row of blocks divided by the axial grooves and arranged circumferentially of the tire at intervals.

The ratio W10/W11 of the axial width W10 of the rib region 31 to the axial width W11 of the block region 32 is preferably set in a range of not less than 0.2, more preferably not less than 0.23, but not more than 0.3, more preferably not more than 0.27 in order to improve the wandering performance, while maintaining the steering stability.

Each of the shoulder land portions 30 is provided with shoulder axial grooves 33, shoulder circumferential sipes 34, and shoulder axial sipes 35.

Each of the shoulder axial grooves 33 extends axially inwardly from the tread edge Te. And preferably, the shoulder axial groove 33 terminates within the shoulder land portion 30. In this embodiment, the shoulder axial grooves 33 in each shoulder land portion 30 are curved slightly and convexly toward one tire circumferential direction.

Such shoulder axial grooves 33 satisfy both of the steering stability and the wandering performance.

At the tread face, the inner end 12e of the shoulder axial groove 33 in this embodiment is straight in parallel with the tire circumferential direction.

The groove width W33 of the shoulder axial groove 33 is set in a range of from 3.5 to 5.5 mm for example.

Such shoulder axial grooves 33 exert good wet performance and good wandering performance.

The shoulder circumferential sipes 34 connect between the circumferentially adjacent shoulder axial grooves 33. In this embodiment, each of the shoulder circumferential sipes 34 is connected to the axially inner end part 33i of one of the shoulder axial grooves 33.

Such shoulder circumferential sipes 34 exert good wet performance.

In this embodiment, each of the shoulder circumferential sipes 34 extend straight in parallel with the tire circumferential direction.

The shoulder circumferential sipes 34 can decrease the pressure of the air in the shoulder axial grooves 33 which pressure is increased when entered in the ground contacting patch of the tire, therefore so called pumping noise sound from the shoulder axial groove 33 can be reduced.

Between the shoulder circumferential sipes 34 and the shoulder main groove 3, the above-mentioned circumferentially continuous rib 31 is formed.

Such rib 31 reduces the transmittal toward the tread edge, of pumping noise sound generated from the grooves on the axially inside thereof and impact sound of the land portion, therefore, the noise performance can be improved.

The width W5 of the rib 31 is preferably set in a range of not less than 0.15 times, more preferably not less than 0.18 times, but not more than 0.25 times, more preferably not more than 0.22 times the width W4 of the shoulder land portion 30. In this embodiment, the rib 31 extends straight with a substantially constant width.

Such rib 31 maintains the rigidity of the shoulder land portion and exerts good steering stability.

Further, such rib 31 improves the noise performance and the wet performance in a well balanced manner.

The shoulder axial sipes 35 are each disposed between every two of the circumferentially adjacent shoulder axial groove 33.

The shoulder axial sipes 35 extend substantially parallel with the shoulder axial grooves 33.

The shoulder axial sipes 35 extend axially inwardly from the tread edge Te and terminate within the shoulder land portion 30. Such shoulder axial sipes 35 improve the wandering performance.

Figure 8:
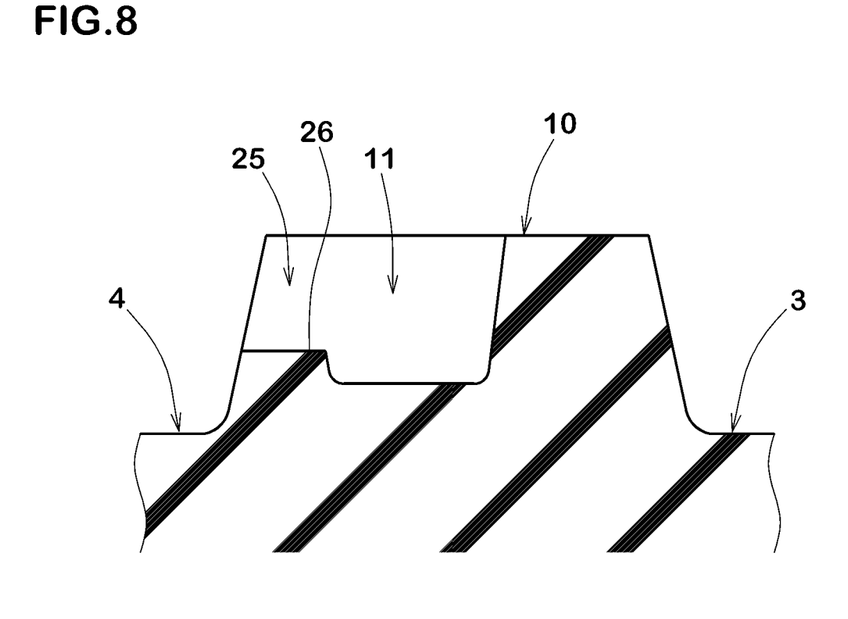
FIG. 8 is a cross sectional view an inside middle lug groove taken along its widthwise center line.

It is preferable that, as shown in FIG. 8, the inside middle lug groove 11 is provided in its axially inner end part 25 with a tie bar 26 rising from the groove bottom in order to reduce or prevent uneven wear occurring in the vicinity of the axially inner end part.

Figure 9:
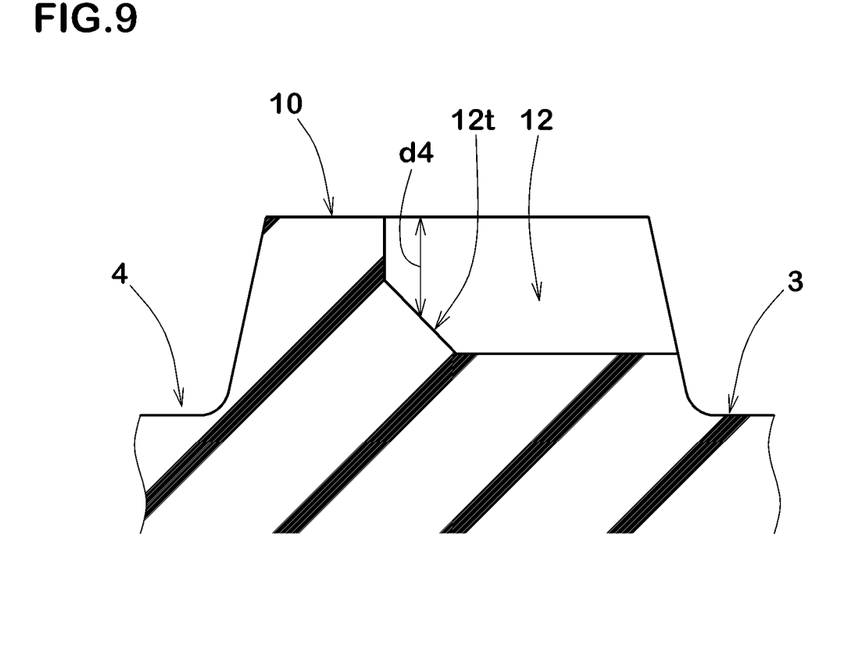
FIG. 9 is a cross sectional view of an outside middle lug groove taken along its widthwise center line.

It is preferable that, as shown in FIG. 9, the groove depth d4 of the axially inner end part 12t of the outside middle lug groove 12 gradually increase from the axially inside to the axially outside of the tire so as to maintain the rigidity of the middle land portion 10 in its central portion and thereby to improve the steering stability.

It is preferable that, between the axially adjacent shoulder land portion 30 and middle land portion 10, the circumferential extent of each of the outside middle lug grooves 12 in the middle land portion 10 does not overlap in the tire circumferential direction with the circumferential extent of any of the shoulder axial grooves 33 in the shoulder land portion 30 in order that pumping noise sound from the outside middle lug grooves 12 and that from the shoulder axial grooves 33 turn to white noise.

Comparison Test 1

Based on the tread pattern shown in FIG. 1, pneumatic tires of size 225/65R17 (rim size 17×6.5J) for passenger cars having specifications listed in Table 1 were experimentally manufactured.

The tires were tested for the wet performance and the steering stability, using a test car (2400 cc 4WD passenger car) provided on all of the four wheels with the test tires inflated to 220 kPa.

<Wet Performance>

The test car was run along a 100 meter radius circle on an asphalt road partially provided with a 5 mm depth 20 m long water pool, and the lateral acceleration (lateral G) during running in the water pool was measured at the front wheels, gradually increasing the speed entering into the water pool, to obtain the average for the speed range of from 50 to 80 km/h. The results are indicated in Table 1 by an index based on Comparative example tire Ref.1 being 100, wherein the larger the value, the better, the wet performance.

<Steering Stability>

The test car was run on a dry asphalt road in a test course, and the test driver evaluated steering stability, based on the handle response, rigidity, grip and the like.

The results are indicated in Table 1 by an index based on comparative example tire Ref.1 being 100, wherein the larger the value, the better the steering stability.

TABLE 1

| Tire | Ref. 1 | Ref. 2 | Ex. 1 | Ex. 2 | Ex. 3 | Ex. 4 | Ex. 5 | Ref. 3 | Ref. 4 | Ex. 6 | Ex. 7 | Ex. 8 | Ex. 9 |
|---|---|---|---|---|---|---|---|---|---|---|---|---|---|
| Inside middle lug grooves | | | | | | | | | | | | | |
| angle θ1 (deg.) | 90.0 | 10.0 | 30.0 | 20.0 | 25.0 | 35.0 | 45.0 | 55.0 | 30.0 | 30.0 | 30.0 | 30.0 | 30.0 |
| angle θ3 (deg.) | 90.0 | 70.0 | 70.0 | 70.0 | 70.0 | 70.0 | 70.0 | 70.0 | 70.0 | 70.0 | 70.0 | 70.0 | 70.0 |
| length L1/width W3 | 0.35 | 0.35 | 0.35 | 0.35 | 0.35 | 0.35 | 0.35 | 0.35 | 0.35 | 0.35 | 0.35 | 0.35 | 0.35 |
| Outside middle lug grooves | | | | | | | | | | | | | |
| angle θ2 (deg.) | 90.0 | 70.0 | 70.0 | 70.0 | 70.0 | 70.0 | 70.0 | 70.0 | 50.0 | 60.0 | 65.0 | 75.0 | 80.0 |
| (P)resence or (A)bsence of middle reentrant parts | P | P | P | P | P | P | P | P | P | P | P | P | P |
| (P)resence or (A)bsence of center reentrant parts | P | P | P | P | P | P | P | P | P | P | P | P | P |
| Wet performance | 100 | 111 | 110 | 111 | 110 | 109 | 107 | 103 | 110 | 110 | 110 | 109 | 107 |
| Steering stability | 100 | 102 | 110 | 107 | 109 | 110 | 110 | 110 | 103 | 107 | 108 | 110 | 110 |

| Tire | Ref. 5 | Ex. 10 | Ex. 11 | Ex. 12 | Ex. 13 | Ex. 14 | Ex. 15 | Ex. 17 | Ex. 18 | Ex. 19 | Ex. 20 | Ex. 21 |
|---|---|---|---|---|---|---|---|---|---|---|---|---|
| Inside middle lug grooves | | | | | | | | | | | | |
| angle θ1 (deg.) | 30.0 | 30.0 | 30.0 | 30.0 | 30.0 | 30.0 | 30.0 | 30.0 | 30.0 | 30.0 | 30.0 | 30.0 |
| angle θ3 (deg.) | 70.0 | 60.0 | 65.0 | 75.0 | 80.0 | 70.0 | 70.0 | 70.0 | 70.0 | 70.0 | 70.0 | 70.0 |
| length L1/width W3 | 0.35 | 0.35 | 0.35 | 0.35 | 0.35 | 0.15 | 0.25 | 0.45 | 0.50 | 60.0 | 0.35 | 0.35 |
| Outside middle lug grooves | | | | | | | | | | | | |
| angle θ2 (deg.) | 90.0 | 70.0 | 70.0 | 70.0 | 70.0 | 70.0 | 70.0 | 70.0 | 70.0 | 70.0 | 70.0 | 70.0 |
| (P)resence or (A)bsence of middle reentrant parts | P | P | P | P | P | P | P | P | P | P | A | P |
| (P)resence or (A)bsence of center reentrant parts | P | P | P | P | P | P | P | P | P | P | P | A |
| Wet performance | 103 | 110 | 110 | 108 | 107 | 107 | 108 | 110 | 110 | 111 | 108 | 108 |
| Steering stability | 110 | 107 | 108 | 110 | 111 | 110 | 110 | 109 | 108 | 106 | 111 | 111 |

From the test results, it was confirmed that the tires as embodiments of the present invention satisfy both of the wet performance and the steering stability in a well balanced manner.

Comparison Test 2

Based on the tread pattern shown in FIG. 1, pneumatic tires of size 225/65R17 (rim size 17×6.5J) for passenger cars having specifications listed in Table 2 were experimentally manufactured.

In the comparative example tires Ref.1A and Ref.2A, the circumferentially continuous rib 31 in each shoulder portion was not formed as a result of the shoulder axial grooves 33 extended to the shoulder main groove 3.

The tires were tested for the wet performance and the steering stability, using a test car (2400 cc 4WD passenger car) provided on all of the four wheels with the test tires inflated to 220 kPa.

<Wet Performance>

Same as above

<Noise Performance>

The test car was run on a dry rough asphalt road surface of a tire test course at a speed of 100 km/hr, and noise sound was measured in the inside of the test car. The measuring position was near the driver's ear on the outside or window side of the car. Measured was the sound pressure level of a peak occurring at a frequency near 240 Hz—this frequency corresponds to that of the primary resonance mode of the annular air mass in the tire cavity. The results are indicated in Table 2 by an index based on comparative example tire Ref.1A being 100, wherein the larger the value, the smaller the in-car noise.

TABLE 2

| Tire | Ref. 1A | Ref. 2A | Ex. 1A | Ex. 2A | Ex. 3A | Ex. 4A | Ex. 5A | Ex. 6A |
|---|---|---|---|---|---|---|---|---|
| (P)resence or (A)bsence of rib 31 | A | A | P | P | P | P | P | P |
| Rib width W5/Width W4 | — | — | 0.20 | 0.20 | 0.20 | 0.20 | 0.20 | 0.20 |
| Inside middle lug grooves | | | | | | | | |
| angle θ1 (deg.) | 90.0 | 30.0 | 30.0 | 20.0 | 45.0 | 30.0 | 30.0 | 30.0 |
| angle θ2 (deg.) | 90.0 | 70.0 | 70.0 | 70.0 | 70.0 | 70.0 | 70.0 | 60.0 |
| length L1/width W3 | — | 0.35 | 0.35 | 0.35 | 0.35 | 0.25 | 0.50 | 0.35 |
| Outside middle lug grooves | | | | | | | | |
| angle θ3 (deg.) | 90.0 | 70.0 | 70.0 | 70.0 | 70.0 | 70.0 | 70.0 | 70.0 |
| (P)resence or (A)bsence of middle reentrant parts | P | P | P | P | P | P | P | P |
| Wet performance | 100 | 107 | 110 | 114 | 106 | 108 | 110 | 110 |
| Noise performance | 100 | 98 | 110 | 106 | 115 | 112 | 106 | 105 |

| Tire | Ex. 7A | Ex. 8A | Ex. 9A | Ex. 10A | Ex. 11A | Ex. 12A | Ex. 13A | Ex. 14A |
|---|---|---|---|---|---|---|---|---|
| (P)resence or (A)bsence of rib 31 | P | P | P | P | P | P | P | P |
| Rib width W5/Width W4 | 0.20 | 0.20 | 0.20 | 0.15 | 0.25 | 0.30 | 0.35 | 0.20 |
| Inside middle lug grooves | | | | | | | | |
| angle θ1 (deg.) | 30.0 | 30.0 | 30.0 | 30.0 | 30.0 | 30.0 | 30.0 | 30.0 |
| angle θ2 (deg.) | 80.0 | 70.0 | 70.0 | 70.0 | 70.0 | 70.0 | 70.0 | 70.0 |
| length L1/width W3 | 0.35 | 0.35 | 0.35 | 0.35 | 0.35 | 0.35 | 0.35 | 0.35 |
| Outside middle lug grooves | | | | | | | | |
| angle θ3 (deg.) | 70.0 | 60.0 | 80.0 | 70.0 | 70.0 | 70.0 | 70.0 | 70.0 |
| (P)resence or (A)bsence of middle reentrant parts | P | P | P | P | P | P | P | A |
| Wet performance | 107 | 110 | 107 | 113 | 107 | 106 | 105 | 108 |
| Noise performance | 111 | 105 | 111 | 107 | 113 | 114 | 114 | 110 |

From the test results, it was confirmed that the tires as embodiments of the present invention satisfy both of the wet performance and the noise performance in a well balanced manner.

REFERENCE SIGNS LIST 2 tread portion
3 shoulder main groove
4 crown main groove
10 middle land portion
11 inside middle lug groove
12 outside middle lug groove
30 shoulder land portion
31 rib
33 shoulder axial groove
34 shoulder circumferential sipe

The invention claimed is:

1. A pneumatic tire comprising:
a tread portion provided on each side of the tire equator with a middle land portion defined between an axially outer shoulder main groove and an axially inner crown main groove each extending continuously in the tire circumferential direction,
wherein:
said middle land portion is provided with axially inside middle lug grooves and axially outside middle lug grooves arranged alternately in the circumferential direction,
the axially inside middle lug grooves and the axially outside middle lug grooves are inclined to the same direction,
each of the axially inside middle lug grooves is connected to the crown main groove at an angle θ1 of from 20 to 45 degrees with respect to the tire circumferential direction so as to have an axially inner end opened to the crown main groove and an axially outer end terminating within the middle land portion,
each of the outside middle lug grooves is connected to the shoulder main groove at an angle θ2 of from 60 to 80 degrees with respect to the tire circumferential direction so as to have an axially outer end opened to the shoulder main groove and an axially inner end terminating within the middle land portion,
each of the inside middle lug grooves is a bent groove comprising:
an axially inner first part connected to the crown main groove and extending at the angle θ1, and
an axially outer second part extending at an angle θ3 with respect to the tire circumferential direction which is more than the angle θ1, and
the axial length of the first part is 0.25 to 0.50 times the axial width of the middle land portion.

2. The pneumatic tire according to claim 1, wherein the axially outer second parts extend substantially parallel with the outside middle lug grooves.

3. The pneumatic tire according to claim 1, wherein the axially inner end of the outside middle lug groove is positioned axially inside the axially outer end of the inside middle lug groove.

4. The pneumatic tire according to claim 1, wherein the tread portion is provided with a shoulder land portion defined between each said shoulder main groove and the adjacent tread edge, said shoulder land portion is provided with
a plurality of shoulder axial grooves extending axially inwardly from said tread edge and terminating within the shoulder land portion,
a plurality of shoulder circumferential sipes connecting between the axially inner ends of the shoulder axial grooves, and
a circumferentially continuously extending rib defined between said shoulder main groove and said shoulder circumferential sipes.

5. The pneumatic tire according to claim 4, wherein
said shoulder land portion is provided between every two of the circumferentially adjacent shoulder axial grooves with a shoulder axial sipe extending axially inwardly from the tread edge and terminating without being connected to the shoulder circumferential sipes.

6. The pneumatic tire according to claim 5, wherein
the shoulder axial grooves have a groove width of from 3.5 to 5.5 mm, and the shoulder circumferential sipes and the shoulder axial sipes each have a width of not more than 1.0 mm.

7. The pneumatic tire according to claim 4, wherein
the outside middle lug grooves disposed in said middle land portion and the shoulder axial grooves disposed in the adjacent shoulder land portion are arranged circumferentially of the tire such that, in the tire circumferential direction, circumferential extents of the outside middle lug grooves do not overlap with circumferential extents of the shoulder axial grooves.

8. The pneumatic tire according to claim 1, wherein
the middle land portion is provided on its axially inner edge with middle reentrant parts so as to position between the inside middle lug grooves, and the middle land portion is provided with sipes extending between the middle reentrant parts and the inner ends of the outside middle lug grooves.

9. The pneumatic tire according to claim 2, wherein
the middle land portion is provided on its axially inner edge with middle reentrant parts so as to position between the inside middle lug grooves, and the middle land portion is provided with sipes extending between the middle reentrant parts and the inner ends of the outside middle lug grooves.

10. The pneumatic tire according to claim 3, wherein
the middle land portion is provided on its axially inner edge with middle reentrant parts so as to position between the inside middle lug grooves, and the middle land portion is provided with sipes extending between the middle reentrant parts and the inner ends of the outside middle lug grooves.

11. A pneumatic tire comprising:
a tread portion provided on each side of the tire equator with a middle land portion defined between an axially outer shoulder main groove and an axially inner crown main groove each extending continuously in the tire circumferential direction,
wherein:
said middle land portion is provided with axially inside middle lug grooves and axially outside middle lug grooves arranged alternately in the circumferential direction,
the axially inside middle lug grooves and the axially outside middle lug grooves are inclined to the same direction,
each of the axially inside middle lug grooves is connected to the crown main groove at an angle $\theta 1$ of from 20 to 45 degrees with respect to the tire circumferential direction so as to have an axially inner end opened to the crown main groove and an axially outer end terminating within the middle land portion,
each of the outside middle lug grooves is connected to the shoulder main groove at an angle $\theta 2$ of from 60 to 80 degrees with respect to the tire circumferential direction so as to have an axially outer end opened to the shoulder main groove and an axially inner end terminating within the middle land portion,
the middle land portion is provided on its axially inner edge with middle reentrant parts so as to position between the inside middle lug grooves, and
the middle land portion is provided with sipes extending between the middle reentrant parts and the inner ends of the outside middle lug grooves.

12. The pneumatic tire according to claim 11, wherein
the axially inner end of the outside middle lug groove is positioned axially inside the axially outer end of the inside middle lug groove.

13. The pneumatic tire according to claim 11, wherein
each of the inside middle lug grooves is a bent groove comprising
an axially inner first part connected to the crown main groove and extending at the angle $\theta 1$, and
an axially outer second part extending at an angle $\theta 3$ with respect to the tire circumferential direction which is more than the angle $\theta 1$.

14. The pneumatic tire according to claim 13, wherein
the second parts extend substantially parallel with the outside middle lug grooves.

15. The pneumatic tire according to claim 13, wherein
the axially inner end of the outside middle lug groove is positioned axially inside the axially outer end of the inside middle lug groove.

16. The pneumatic tire according to claim 14, wherein
the axially inner end of the outside middle lug groove is positioned axially inside the axially outer end of the inside middle lug groove.

17. The pneumatic tire according to claim 11, wherein
the tread portion is provided with a shoulder land portion defined between each said shoulder main groove and the adjacent tread edge,
said shoulder land portion is provided with a plurality of shoulder axial grooves extending axially inwardly from said tread edge and terminating within the shoulder land portion,
a plurality of shoulder circumferential sipes connecting between the axially inner ends of the shoulder axial grooves, and
a circumferentially continuously extending rib defined between said shoulder main groove and said shoulder circumferential sipes.

18. The pneumatic tire according to claim 17, wherein
said shoulder land portion is provided between every two of the circumferentially adjacent shoulder axial grooves with a shoulder axial sipe extending axially inwardly from the tread edge and terminating without being connected to the shoulder circumferential sipes.

19. The pneumatic tire according to claim 18, wherein
the shoulder axial grooves have a groove width of from 3.5 to 5.5 mm, and the shoulder circumferential sipes and the shoulder axial sipes each have a width of not more than 1.0 mm.

20. The pneumatic tire according to claim 17, wherein
the outside middle lug grooves disposed in said middle land portion and the shoulder axial grooves disposed in the adjacent shoulder land portion are arranged circumferentially of the tire such that, in the tire circumferential direction, circumferential extents of the outside middle lug grooves do not overlap with circumferential extents of the shoulder axial grooves.

* * * * *